United States Patent
Rindal et al.

(10) Patent No.: US 12,481,661 B2
(45) Date of Patent: Nov. 25, 2025

(54) SECRET SHARED DATABASE JOINS USING SORTING

(71) Applicant: VISA INTERNATIONAL SERVICE ASSOCIATION, San Francisco, CA (US)

(72) Inventors: Peter Rindal, Sunnyvale, CA (US); Saikrishna Badrinarayanan, Fremont, CA (US); Srinivasan Raghuraman, Cambridge, MA (US); Gayathri Annapurna Garimella, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/846,214

(22) PCT Filed: Mar. 17, 2023

(86) PCT No.: PCT/US2023/015568
§ 371 (c)(1),
(2) Date: Sep. 11, 2024

(87) PCT Pub. No.: WO2023/211581
PCT Pub. Date: Nov. 2, 2023

(65) Prior Publication Data
US 2025/0200048 A1   Jun. 19, 2025

Related U.S. Application Data

(60) Provisional application No. 63/334,531, filed on Apr. 25, 2022.

(51) Int. Cl.
*G06F 16/2455* (2019.01)
*G06F 16/22* (2019.01)

(52) U.S. Cl.
CPC ...... *G06F 16/2456* (2019.01); *G06F 16/2282* (2019.01)

(58) Field of Classification Search
CPC .......................... G06F 16/2456; G06F 16/2282
USPC ......................................................... 707/741
See application file for complete search history.

(56) References Cited

U.S. PATENT DOCUMENTS

| | | | |
|---|---|---|---|
| 2010/0205351 A1* | 8/2010 | Wiener | G06F 12/0246 711/216 |
| 2010/0332458 A1 | 12/2010 | Xu et al. | |
| 2013/0318067 A1* | 11/2013 | Sukhwani | G06F 16/2456 707/E17.017 |

(Continued)

FOREIGN PATENT DOCUMENTS

EP    2605158 A1    6/2013

OTHER PUBLICATIONS

Application No. PCT/US2023/015568, International Search Report and Written Opinion, Mailed on Jul. 5, 2023, 8 pages.

(Continued)

*Primary Examiner* — Muluemebet Gurmu
(74) *Attorney, Agent, or Firm* — Kilpatrick Townsend & Stockton LLP

(57) ABSTRACT

Embodiments can perform a database join that allows secret shared database join between a database table with a unique matching column and a database table with a non-unique matching column (i.e., contains unbounded repeats of values).

18 Claims, 11 Drawing Sheets

(56) References Cited

U.S. PATENT DOCUMENTS

2017/0255675 A1* 9/2017 Chavan ............. G06F 16/24562
2023/0401274 A1* 12/2023 Denninghoff ...... G06Q 30/0251

OTHER PUBLICATIONS

Blanton et al., "Private and Oblivious Set and Multiset Operations", International Journal of Information Security (IJIS), vol. 15, No. 5, 2016, pp. 493-518.
Application No. EP23796991.0, Extended European Search Report, Mailed on Jun. 30, 2025, 11 pages.
Mohassel et al., "Fast Database Joins and PSI for Secret Shared Data", Proceedings of the 26th ACM SIGKDD International Conference on Knowledge Discovery & Data MininG, Nov. 9-13, 2020, pp. 1271-1287.
Pettai et al., "Combining Differential Privacy and Secure Multiparty Computation", Proceedings of the 2022 International Conference on Management of Data, Dec. 7-Dec. 11, 2015, pp. 421-430.
Schoppmann et al., "Make Some ROOM for the Zeros: Data Sparsity in Secure Distributed Machine Learning", Designing Interactive Systems Conference, Nov. 11-15, 2019, pp. 1335-1350.

* cited by examiner table R 102

| Values1 | Values2 | Primary Key |
|---|---|---|
| a0 | a1 | a |
| b0 | b1 | b |
| g0 | g1 | g | table Q 104

| Primary Key | Values3 |
|---|---|
| d | d3 |
| a | a3 |
| i | i3 |
| g | g3 |

<inner join> table T = R join Q 106

| Values1 | Values2 | Primary Key | Values3 |
|---|---|---|---|
| a0 | a1 | a | a3 |
| g0 | g1 | g | g3 |

Table 202:

| Values1 | Values2 | Primary Key |
|---|---|---|
| a0 | a1 | a |
| b0 | b2 | b |
| g0 | g1 | g |

<inner join>

Table 204:

| Primary Key | Values3 |
|---|---|
| a | a3* |
| a | a3 |
| i | i3 |
| g | g3 |
| a | a3! |

Table 206:

| Values1 | Values2 | Primary Key | Values3 |
|---|---|---|---|
| a0 | a1 | a | a3* |
| a0 | a1 | a | a3 |
| a0 | a1 | a | a3! |
| g0 | g1 | g | g3 |

| Values1 | Values2 | Primary Key |
|---|---|---|
| a0 | a1 | a |
| b0 | b2 | b |
| g0 | g1 | g |

404

| Primary Key | Values3 |
|---|---|
| a | a3* |
| a | a3 |
| i | i3 |
| g | g3 |
| a | a3i |

| | Values1 | Values2 | Primary Key |
|---|---|---|---|
| V_a₀ | a0 | a1 | a |
| V_b₀ | b0 | b2 | b |
| V_g₀ | g0 | g1 | g |

500B

508

| | Primary Key | Values3 |
|---|---|---|
| V_a₁ | a | a3* |
| V_a₁ | a | a3 |
| V_i₁ | i | i3 |
| V_g₁ | g | g3 |
| V_a₁ | a | a3! |

510

| | Values1 | Values2 | Primary Key | Values3 |
|---|---|---|---|---|
| V_a' | a0 | a1 | a | a3* |
| V_a' | a0 | a1 | a | a3 |
| V_a' | a0 | a1 | a | a3! |
| V_g' | g0 | g1 | g | g3 |

FIG. 5B

SECRET SHARED DATABASE JOINS USING SORTING

CROSS-REFERENCES TO RELATED APPLICATIONS

The present application is a 371 application of PCT application number PCT/US2023/01556, filed Mar. 17, 2023, which claims priority to U.S. Provisional Application No. 63/334,531, entitled "SECRET-SHARED DATABASE JOINS USING SORTING" filed Apr. 25, 2022, the entire contents of which are herein incorporated by reference for all purposes.

BACKGROUND

The secret sharing technique allows different parties to see the result of joins in their respective database table without compromising the security of each party's individual database table. For example, consider a situation where party A and party B both have user data. Each party generally does not want their user data to be shared with the other party but may want to perform a query (such as a join) on each other's data. By using secret share database join, party A or party B would be able to access the joined database table without revealing their own private database table to each other. Therefore, it is desirable to provide techniques to perform joins of secret shared databases in a variety of situations.

SUMMARY

One embodiment of the disclosure includes a method of performing a secret-shared join of a first database table and a second database table stored respectively on a first computer and a second computer. The method comprises of performing, by the first computer, a multi-party computation in conjunction with the second computer: storing the first database table having a first column and a second column, the first column used to join the first database table and the second database table, wherein the second database table includes the first column and a third column, wherein the first column is a matching column between the first database table and the second database table: distributing shares of the first database table to the second computer, wherein the second computer distributes shares of the second database table to the first computer: modifying first values of the of the matching column of the first database table by appending a first identifier that indicates the first values correspond to the first database table, thereby generating first modified values: modifying second values of the matching column of the second database table by appending a second identifier that indicates the second values correspond to the second database table, thereby generating second modified values, wherein a modified value includes (1) a first value or a second value and (2) either of the first identifier or the second identifier: generating an unsorted list that includes the first modified values and the second modified values: sorting the first modified values and the second modified values of the unsorted list to create a sorted list: determining a bit vector by comparing a current modified value of the sorted list to a previous modified value to determine whether the current modified value is a matching value, wherein a bit value in the bit vector specifies whether a row having the matching value of the first database table and a row having the matching value of the second database table are to be combined in a combined row of a combined database table; and generating the combined database table using the bit vector, values of the second column of the first database table, and values of the third column of the second database table.

These and other embodiments of the disclosure are described in detail below. For example, other embodiments are directed to systems, devices, and computer readable media associated with methods described herein.

A better understanding of the nature and advantages of embodiments of the invention may be gained with reference to the following detailed description and accompanying drawings.

BRIEF DESCRIPTION OF THE DRAWINGS

FIG. 1 shows an exemplary one-to-one database join between two database tables.

FIG. 2 shows an exemplary one-to-many database join between two database tables.

FIG. 4 shows exemplary tables of sorted and unsorted values of matching columns from a first database table and a second database table.

FIG. 5A shows exemplary tables and bit vectors according to some embodiments.

FIG. 5B shows exemplary tables with row notations.

TERMS

Figure 3:
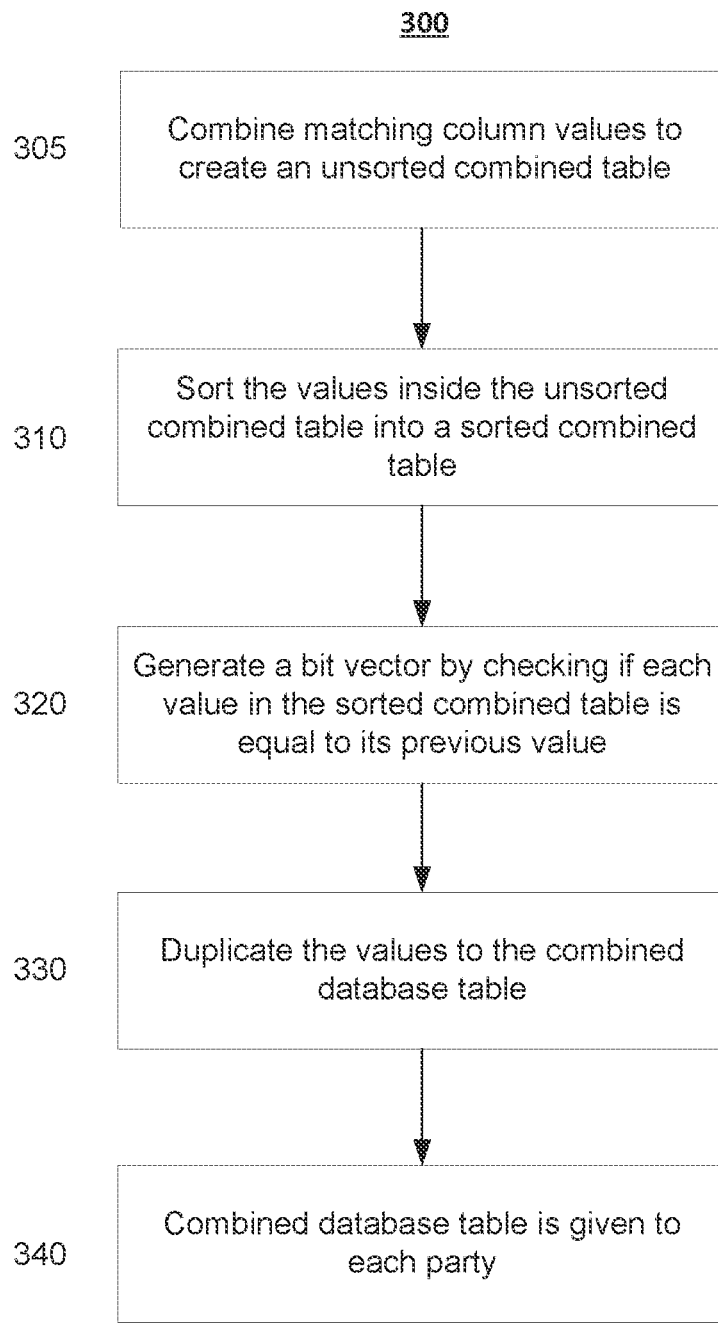
FIG. 3 shows a flowchart corresponding to a secret-shared database join method according to some embodiments.

Prior to discussing embodiments of the disclosure, some terms can be described in further detail.

A "database join" may refer to two or more database tables being joined on "matching values" of a "matching column". A "primary key" or "matching column" may refer to a database field (column) from each database that is being used to join between two databases. For example, a first database may be joined with a second database using a common field (i.e., a field that exists in both databases), more specifically using values that are common to both databases in the common field (matching column). The values inside the matching column of the first database table can be different than the values inside the matching column of the second database table. The values that match within the matching columns of the two databases can be referred as "matching values" or "primary values". A "private set intersection" (PSI) may refer to a database join performed between two or more computers (each storing a respective database table) without exposing their raw data to the other computers.

A "server computer" may include a powerful computer or cluster of computers. For example, the server computer can include a large mainframe, a minicomputer cluster, or a group of servers functioning as a unit. In one example, the server computer can include a database server coupled to a web server. The server computer may comprise one or more computational apparatuses and may use any of a variety of computing structures, arrangements, and compilations for servicing the requests from one or more client computers.

A "multi-party computation" (MPC) may refer to a computation that is performed by multiple parties. Each party, such as a computer, server, or cryptographic device, may have some inputs to the computation. Each party can collectively calculate the output of the computation using the inputs.

A "secure multi-party computation" (secure MPC) may refer to a multi-party computation that is secure. In some cases, "secure multi-party computation" refers to a multi-party computation in which the parties do not share information or other inputs with each other. Determining a PSI can be accomplished using a secure MPC. The inputs from each computer in an MPC may be secret shares of a value that is known to one computer. For example, a first computer can split a database value into multiple secret shares and distribute the shares among the computers. Only the first computer may know how to assemble the shares to reconstruct the database value. One way to generate the shares is by selecting a random number and then taking an XOR of the random number and a value of an individual database table, which can be done independently for each value in a database.

The term "secret sharing" can refer to any one of various techniques that can be used to store a data item on a set of computers such that each computer cannot determine the value of the data item on its own. As examples, the secret sharing can involve splitting a data item up into shares that require a sufficient number (e.g., all) of computers to reconstruct and/or encryption mechanisms where decryption requires collusion among the computers.

A "client computer" may refer to a computer that uses the services of other computers or devices, such as server computers. A client computer may connect to these other computers or devices over a network such as the Internet. As an example, a client computer may comprise a laptop computer that connects to an image hosting server in order to view images stored on the image hosting server.

DETAILED DESCRIPTION

Secret sharing techniques can allow different computers to see the result of joins in their respective database tables without compromising the security of each computer's individual database table. Prior to joining, the values of the individual database tables used for joining are secret shared among the different computers, where the shares (also referred to as secret shares) from different computers are used to obtain the values of the individual database tables. The shares of the individual database tables may further be used by the computers to perform a secret-shared database join. After a secret-shared database join, each computer can obtain a share of values of the joined database table.

Certain techniques of performing a secret shared database join are limited. Only database tables with unique matching columns are able to perform secret shared database join. This severely limits the type of database tables that can be joined using secret sharing, as only database tables with one or more unique matching columns can be joined. To solve this problem, embodiments can perform a database join that allows secret shared database join between a database table with a unique matching column and a database table with a non-unique matching column (i.e., one that contains unbounded repeats of values).

Embodiments can perform a secret shared database join by first obtaining some or all the values of the matching columns of the two database tables, where the matching column of a first database table is unique, and the matching column of a second database table can be unbounded. The values of the first database table and the second database table can be modified by appending a first identifier and a second identifier, where 0) represent the first identifier and 1 represent the second identifier, to create modified values. Each identifier represents which database table the values are from. The modified values can be stored in an unsorted combined table (also referred to as an unsorted combined list). For example, if the first database table has unique values for the matching column of $\{a, b, c, e\}$, and the second database table has unbounded values of the matching column of $\{b, b, c, d, e\}$, then embodiments can modify and combine these values to create modified values of $\{a_0, b_0, c_0, e_0, b_1, b_1, c_1, d_1, e_1\}$ in the unsorted combined (join) table.

The computers can sort on the unsorted combined table where a modified value from the first database table comes first, and modified values from the second database table that match the modified value of the first database table come next. For example, for the unsorted combined table $\{a_0, b_0, c_0, e_0, b_1, b_1, c_1, d_1, e_1\}$, the sorted combined table can be $\{a_0, b_0, b_1, b_1, c_0, c_1, e_0, e_1, d_1\}$, where $b_1$ comes after $b_0$ but before $c_0$ because $b_1$ matches with the $b_0$. The sorting is also applied for modified values $c_1$ and $e_1$ from the second database table.

The computers can compare the modified values inside the sorted combined table to produce a bit vector, where a value of 0 indicates there is no matching value from the second database table to the first database table, and a value of 1 indicates there is matching value from the second database table to the first database table. The bit vector is determined by comparing the modified values of neighboring rows in the sorted combined table. For example, the embodiments can output a bit vector of $\{0, 0, 1, 1, 0, 1, 0, 1, 0\}$ for a sorted combined table $\{a_0, b_0, b_1, b_1, c_0, c_1, e_0, e_1, d_1\}$, as $b_1$ matches with $b_0$, $c_1$ matches with $c_0$, and $e_1$ matches with $e_0$.

The computers can combine one or more values of one or more other columns of a row that has a matching value from the first database table with one or more values of one or more other columns of one or more rows having the matching value in the second database table according to the bit vector $\{0, 0, 1, 1, 0, 1, 0, 1, 0\}$. Effectively, the matching values in the row of the first database table are combined with matching values of the row of the second database table. Having a value 1 in the bit vector indicates that there is a match of the current value between the first database table and the second database table. Therefore, whenever a bit vector has a value of 1, the row of the first database table can be combined with the row of the second database table on a matching value. For example, for the sorted combined table $\{a_0, b_0, b_1, b_1, c_0, c_1, e_0, e_1, d_1\}$ and the bit vector $\{0, 0, 1, 1, 0, 1, 0, 1, 0\}$, the row of the first database table with the matching value $b_0$ would be combined with the rows of the second database table with the matching value $b_1$, as the bit vector for those $b_1$ values have a value of 1. Once at least some of the rows from the first database table with matching values are combined with the second database table, the combined rows could then be copied to a combined database table.

In some embodiments, the computers can combine rows of the matching values from the first database table with the second database table using a tree. In such a tree, each leaf node indicates a value of the sorted combined table. Using a first set of functions, the node values in the tree can then be updated from leaf nodes to a root node of the tree during a so-called upstream processing phase. After the root node is updated, and using a second set of functions, the tree can then be updated from the root node to the leaf nodes during a so-called downstream processing phase. During this downstream processing phase, rows of the matching values of the first database table can be combined with the rows of the second database table that have matching values as the first database table. The combined rows may then be copied to a combined database table.

I. Database Join

A database join, or inner join, may involve two database tables joining on matching columns between the two database tables. There are many other operations that are useful in finding a relationship between two database tables, such as union, intersection, outer join, and etc. Among the operations used to find the relationship between two database tables, one of the most commonly used operations is inner join. The inner join first determines matching rows from the two database tables by determining values that match as between columns of the two database tables (so-called matching columns). These matching rows of the two database tables are then joined based on the matching columns to create rows of a combined database table.

A. One-To-One Database Join

A database join may be a one-to-one join where matching columns of both database tables are unique. A unique matching column is a column with no repeats of the values in that column. Therefore, when performing a join between the two database tables with unique matching columns, the matching row of one database table is related to exactly one row of another database table.

FIG. 1 shows an exemplary one-to-one database join where a first database table 102 and a second database table 104 are combined on matching values of the matching columns (labeled as the "primary key" column in FIG. 1) to produce a combined database table 106. The primary key column of the first database table 102 and second database table 104 are unique matching columns. The matching rows of the two database tables are combined into the rows of the combined database table 106.

A database table may be comprised of series of columns. For example, the first database table 102 is comprised of values1 column, values2, column, and a "primary key" column. The second database table 104 is comprised of "primary key" column and values3 column. The first database table is joined with the second database table along the matching columns "primary key" to produce the combined database table 106.

The combined database table 106 does not include rows where "primary key" values do not match between the first database table 102 and the second database table 104. Therefore, in the example of FIG. 1, only the matching rows where "primary key" values of the first database table 102 and the second database table 104 match, such as rows with values "a" and "g" in the combined database table 106, are in the combined database table 106. These rows are determined by combining matching rows of the first database table 102 with matching rows of the second database table 104 on matching "primary key" values. Since the names of the matching columns (primary key) for the first database table and the second database table are the same, they are combined into one column in the combined database table 106.

In the example shown in FIG. 1, the values "a0" from values1 column and "a1" from values2 column of the first database table 102 are from the same row as the value "a" from the "primary key" column. In the second database table 104, the value "a3" from values3 column is in the same row as "a" from "primary key" column. Since the first database table 102 and the second database table 104 are joined over the "primary key" columns, the combined database table 106 would combine the matching rows of the first database table 102 with matching rows of the second database table 104 where the "primary key" values match. For example, since the "primary key" value "a" matches for both the first database table 102 and the second database table 104, values "a0" from values 1 column, "a1" from values2 column, "a" from "primary key" column, and "a3" from values3 column will be combined into one row. The combining of matching rows from the first database table 102 and the second database table 104 is also applied to the matching "primary key" value "g".

Each matching row of the first database table 102 is related to exactly one matching row of the second database table 103. For example, there is exactly one row from both the first database table 102 and the second database table 104 with the matching "primary key" value "a". There is also exactly one row from both the first database table 102 and the second database table 104 for the matching value "g".

B. One-To-Many Database Join

A database join may be a one-to-many join, where a matching column of one database table is unique while a matching column of another database table can be unbounded (i.e., can be repeated). Therefore, when performing a join between a first database table with a unique matching column and a second database table with unbounded matching column, each matching row of the first database table is related to one or more rows of the second database table.

FIG. 2 is an example of a one-to-many database join. FIG. 2 shows a database join between two database tables, where the "primary key" column for both tables are used as matching columns to join a first database table 202 and a second database table 204. The first database table 202 has a unique "primary key" column. The second database table 204 has an unbounded "primary key" column.

In the combined database table 206, the rows where "primary key" values do not match between the first database table 202 and the second database table 204 are not included in the combined database table 206. Only the matching rows where "primary key" values of the first database table 202 and the second database table 204 match, such as rows with values "a" and "g" in the combined database table 206, are in the combined database table 206. These rows are determined by combining matching rows of the first database table 202 with matching rows of the second database table 204 on matching "primary key" values. The second database table 204 can have rows with duplicate matching "primary key" values, such as rows with the value "a". In this case, the rows of the first database table 202 with the matching primary key values can be used multiple times to combine with the rows of the second database table 204 with duplicate matching "primary key" values. Since the names of the matching columns (primary key) for the first database table and the second database table are the same, they are combined into one column in the combined database table 206.

For example, in FIG. 2, rows with primary key values "a" and "g" match for the first database table 202 and the second database table 204. In the first database table 202, the values "a0" from values 1 column and "a1" from values2 column are from the same row as the value "a" from the primary key column. In the second database table 204, there are three rows with value "a" from the primary key column, having values "a3*", "a3", and "a3!" respectively. Since the first database table 202 and the second database table 204 are joined over the primary key columns, the combined database table 206 would combine the matching rows of the first database table with matching rows of the second database table where the primary key values match. The second database table 204 has rows with duplicate matching primary key value "a". Therefore, the rows of the first database table 202 with the matching primary key value "a" is used multiple times to combine with the rows of the second database table 204 with duplicate matching "primary key" values "a". For example, the matching row of the first database table 202 with values "a0" from values1 column, "a1" from values2 column. "a" from primary key column is used three times to combine with matching rows of the second database table 204 with value "a" from the primary key column and values "a3*". "a3", and "a3!" from values3 column. The combining of matching rows from the first database table 202 and the second database table 204 is also applied to the matching "primary key" value "g", but in this case there is only one row in the second database table 204 having a value for primary key "g".

It can be seen that each matching row of the first database table 202 is related to one or more matching rows of the second database table 204. For example, there is exactly one row from the first database table 202 but three rows from the second database table 204 with the matching "primary key" value "a". There is exactly one row from both the first database table 202 and exactly one row from the second database table 204 for the matching value "g". A one-to-many database join brings lots of flexibility compared to one-to-one join. For example, in the case of a database table that stores information relating to user activity such as accessing various network services, a database join between an encrypted user table (unique user information) and an encrypted action table (many actions per user) is most likely to need a one-to-many database join because—for this example—any given user can be expected to access more than one network service, thus conducting more than one action, or even perform the same action multiple times for the same network service.

II. Performing Secret Shared Database Join

As seen in FIG. 1 and FIG. 2, performing a join between two database tables generally accesses all the elements in both database tables. This may not be a problem if the datasets are owned or controlled by a single computer. However, if the database tables are owned or held by different computers, both computers would need to reveal their private database tables to each other to perform a join operation. Exposing private database tables is undesirable. To address this issue, secret shared database joins that use secure multi-party computation can be used to join private database tables.

Generally, secret share database joins are useful when there is data in a private database table on one computer and data in private database table on another computer, and each computer does not want to give access to their own private database table to the other computer. For example, consider a situation where computer A and computer B both have user data. They do not want to share their user data to each other but may want to perform a query (such as a join) on each other's data. By using secret share database join, the computer A or the computer B would be able to access the joined database table without revealing their own private database table to each other.

FIG. 3 shows a flowchart corresponding to a secret-shared database join method according to some embodiments. Step 305 combines the values from matching columns to generate an unsorted combined table. Step 310 sorts the values in the unsorted combined table to create a sorted combined table. Step 320 compares the values in the sorted combined table to generate a bit vector. Step 330 combines the matching rows of the first database table 202 with matching values to the matching rows of the second database table 204 with the matching values using the bit vector and copy the combined rows to a combined database table 206. Step 340, once the combined database table 206 is computed, secret shares of the combined database table 206 can be provided to each server.

In step 305, the values of matching columns of two database tables are combined to create an unsorted combined list (also referred to as a table). For example, in FIG. 2, the values of the matching column of the first database table 202 "a", "b", and "g" and the values of the matching column of the second database table 204 "a", "a", "i", "g", "a" are combined. All the values of the matching column of the first database table 202 can be stored first, and all the values of the matching column of the second database table 204 can come after.

Prior to storing values in the unsorted combined table, the values of the matching columns of the first database table and the second database table can be modified by appending a first identifier and a second identifier, where 0 represent the first identifier and 1 represent the second identifier, to create modified values of the matching columns. Each identifier represents which database table the modified values are from. After modifying and combining the values, the unsorted combined table would include $\{a_0, b_0, g_0, a_1, a_1, i_1, g_1, a_1\}$. Details of such modifying are provided in later sections.

In step 310, once the values of the matching columns of the two database tables are combined to create the unsorted combined table, the modified values inside the unsorted combined table are sorted to create a sorted combined table. The modified values inside the unsorted combined table are sorted in such a way where a modified value from the first database table comes first, and modified values from the second database table that are equivalent to the modified value of the first database table comes next. For example, since "$a_0$" of the first database table 202 and three "$a_1$" of the second database table 204 match, "$a_0$" from the first database table 202 would come first and the three "$a_1$" of the second database table 204 would come next. The generation of sorted combined table from the unsorted combined table is further described below with reference to FIG. 4. Because both database tables are secret shared, the sorted combined table will also be secret shared among the parties, and the sorting will also be done securely (e.g., by techniques described in Koji Chida, Koki Hamada, Dai Ikarashi, Ryo Kikuchi, Naoto Kiribuchi, and Benny Pinkas. "An Efficient Secure Three-party Sorting Protocol with an Honest Majority". *Cryptology ePrint Archive. Report* 2019/695, 12 Jun. 2019)

In step 320, each value inside the combined table is compared to its previous neighboring value (e.g., the left neighboring value when the first database table has unique values in the matching column and the first database table has a lower computer identifier than the second database table). The result of the comparison is recorded in a bit vector. The bit vector indicates whether the current value from the second database table has a matching value in the first database table. The bit vector may have a length equal to a sum of a number of rows from the first database table and a number of rows of the second database table. A bit value of 0) indicates there is no match, and a bit value of 1 indicates there is a match. Because the first value of the combined table would not have a value to compare to, the first value of the bit vector will always be assigned 0 to start. Further details with regards to generating a bit vector will be described below with reference to FIGS. 5A-5B.

In step 330, once the bit vector is formed, the rows of the matching values of the first database table are combined with the rows of the matching values of the second database table. For example, the bit vector may be used to identify when the rows of the matching values of the first database table are combined with the rows of the matching values of the second database table. Using the bit vector to determine which rows to combine will be described below with reference to FIGS. 5A-5B. Once the matching rows of the first database table have been combined with the matching rows in the second database table, the combined rows may be copied to the combined database table.

In step 340, once the combined rows have been copied into the combined database table, the secret shares of the combined database table may be distributed in a variety of ways. For example, the shares can be used as an individual database table for another secret shared join, or they may be combined by a server to access the values of the combined database table.

III. Secret Shared Database Joins

The secret shared database join is a multi-party computation in which all the parties, or servers, perform each step in secret shared database join. Prior to performing a secret shared database join, the individual database tables that are used to join and output a combined database table are secret shared. The shares of the individual database tables are given to each computer performing a secret shared database join.

The shares of the individual database can be generated in various ways. One way to generate the shares is by selecting a random number and then taking an XOR of the random number and a value of an individual database table, which can be done independently for each value in a database. The random number or the XOR difference can be sent to the other computer. Multiple random numbers can be used when there are more than two computers. Another way to generate the shares is by generating random values in such a way where the addition or the multiplication of the random values can result in the value of the individual database table. For example, if there are three secret shares need to be generated for three computers, then two shares can be randomly generated, and the values of these two shares can be subtracted or divided by the value of the individual database table. This can be done independently for each value in the database. The listed two methods can require that the number of shares needed to reconstruct the secret or value of the database is equal to the number of shares that are split into.

The shares of the individual database can be generated in various ways without the limitation of having the number of shares needed to reconstruct the secret to be equal to the number of shares that are split into. One way is by using additive-shamir technique. The additive-shamir can sample a random polynomial function $(p(x)=a_0+a_1*x+a_{k-1}*x^{k-1})$ with the highest degree being the minimal number of shares to reconstruct a secret (k) minus one. Each share can have a value $x_i=p(i)$ for $i=1 \ldots, n$, where n is the total number of shares that are split into. The secret or the value of the individual table can be the result of the function for input (such that p(0))=secret. Using a polynomial interpolation, any number of shares greater than or equal to k can be used reconstruct the polynomial function to find the value of p(0), or the secret. Another way is by using replicated secret sharing, or additive-replicated technique. For some random value d, total number of shares n, and minimum number of shares to reconstruct a secret k, the random values $x_1, \ldots, x_{d-1}$ can be randomly generated such that $x_d=x-x1- \ldots -x_{d-1}$, where x is a secret value. Each party or computer can have some unique subset of $x_1, \ldots, x_d$ such that for all subsets of size k, these k subsets will have all of the values $x_1, \ldots, x_d$, which can be used to reconstruct the secret.

The individual database tables that the different parties use can be secret shared in a variety of ways. One way is to use an output database table of the secret shared join in one instance as an input database table of the secret shared join in another instance. Another way can be the computer holding a complete individual database table distributing the shares of the individual database table to other parties directly. Details regarding secret sharing of the individual database tables and the output database table are further described below with reference to FIG. 8.

The secret-shared database joins may be comprised of three steps: sorting, comparing, and duplicating. Because the individual database tables are secret shared among the servers, the join between the two individual database tables requires identifying which values from the second database table match with the first database table on matching columns. In order to determine which values match, the values of the matching columns of the two database tables may be sorted and compared to determine a bit vector. Once the bit vector is determined, the servers can use the bit vector to determine the matching values and combine the rows of the matching values from the first database table to the second database table. The combined rows can then be duplicated into a combined database table.

A. Sorting

FIG. 4 shows an exemplary table of an unsorted combined table 406 and a sorted combined table 408 of matching columns from a first database table 402 and a second database table 404. The first database table 402 match with the first database table 202 in FIG. 2, and the second database table 404 match with the second database table 204 in FIG. 2. The values of the matching columns ("primary key") of the first database table 402 and the second database table 404 are combined into the unsorted combined table 406, which are sorted to generate the sorted combined table 408.

In the first database table 402, the values under the primary key column are "a", "b", and "g". In the second database table 404, the values under the primary key column are "a", "a", "i", "g", and "a". Since the primary key column is the matching column, the primary key values of both database tables are first combined to generate the unsorted combined table 406. All the values of the matching column of the first database table 402 come first, and all the values of the matching column of the second database table 404 come after.

Prior to combining the values to generate the unsorted combined table 406, the values of the matching columns of first database table and the second database table, or the primary key values of the first database table and the second database table, are modified by appending first identifiers and second identifiers, where 0) represent the first identifier and 1 represent the second identifier, to create modified values. The subscripts in the unsorted combined table 406 represent identifiers that indicate which database table it came from. For example, "$a_0$" in the unsorted combined table 406 would be the matching value "a" from the first database table.

The unsorted combined table 406 then goes through a sorting operation where a modified value of the first database table comes first, and modified values of the second database table that match with the modified value of the first database table come next. For example, since the first modified value of the first database table is "$a_0$", this is appended first and the next modified values that are appended would be the values of the second database table that match "a". Therefore, in the sorted combined table 408, this is represented as $\{a_0, a_1, a_1, a_1, \ldots\}$ since there are three "$a_1$" modified values in the second database table. If there is no match, then the current modified value of the first database table 402 is appended and the next modified value of the first database table 402 is used to check if there are matches in the modified values of the second database table 404. For example, since there is no modified value "$b_1$" in the second database table 404, the modified value "$b_0$" is appended and the next modified value "$g_0$" of the first database table 402 is checked to see if there is a matching modified value in the second database table 404. The sorting is applied to all the modified values in the unsorted combined table 406 to generate the sorted combined table 408.

Because both the first database table 402 and the second database table 404 are secret shared, the modified values of the unsorted combined table 406 would also be secret shared, and the sorting must be done in a secure setting. The secure sorting protocol may be done using techniques described in Koji Chida, Koki Hamada, Dai Ikarashi, Ryo Kikuchi, Naoto Kiribuchi, and Benny Pinkas. "An Efficient Secure Three-party Sorting Protocol with an Honest Majority". *Cryptology ePrint Archive. Report* 2019/695, 12 Jun. 2019.

B. Comparison

FIG. 5A shows exemplary combined tables which are used to generate bit vectors. The values inside a first sorted combined table 502A are compared to produce a first bit vector 502B. The values inside a second sorted combined table 504A are compared to produce a second bit vector 504B.

The values inside a sorted combined table are compared to generate a bit vector. Comparing the values of a bit vector always involve looking at adjacent (previous) elements of the sorted combined table. The bit value 1 indicates there is a match for the current value between the first database table and the second database table. The bit value 0 indicates there is no match for the current value between the first database table and the second database table. In the example below, the previous element is considered to be to the left for ease of illustration. The bit vector may have a length equal to a sum of a number of rows from the first database table and a number of rows of the second database table.

If the left adjacent value is from the first database table and the current value is from the second database table, and the values match, then the current bit will have a value of 1. If both left adjacent value and current value are from the second database table, and the values match, then the left adjacent bit is copied to the current bit. This is because if the left adjacent bit is 1, it means that the left adjacent value matched with the value from the first database table. Since the left adjacent value is the same as the current value, it means that the current value has a match with the value from the first database table. However, if the left adjacent bit is 0, it means that the left adjacent value was not able to match with the first database table, and since the current value has the same value as the left adjacent value, there is no match with the first database table. In all other cases where the values do not match, the current bit will have a value of 0. Also, by default, any bit vectors will have a default value of 0 as its first element, as there is no value to the left for the first combined table value to compare.

For example, in the first sorted combined table 502A, the first value is "$a_0$". Since the first value "$a_0$" does not have any value to the left to compare it with, the first bit vector 502B will have its first element to be 0. The second value of the first sorted combined table 502A has value "$a_1$". Since the first value of the first sorted key value pair 502A has a value "$a_0$", the first value and the second value match. This will give the second value of the first bit vector to have a value of 1, as the two values matches, and are from different database tables. The row having the matching value in the first database table can match with multiple rows having the matching value in the second database table. Since both the second and third values of the first sorted combined table 502A are from the second database table, and the values ($a_1$) match, the second value of the first bit vector 502B is copied to the third value of the first bit vector 502B, which is 1. The fourth value of the first bit vector 502B will also have a value of 1, since the third value and the fourth value of the first sorted combined table 502A are from the second database table and match. However, the fourth and fifth values are different, as the fourth value has a value of "$a_1$" while the fifth value has a value of "$b_0$". Therefore, the fifth value of the first bit vector 502B would have a value of 0. These comparison between the values will continue until all the values inside the first sorted combined table 502A are compared.

C. Duplication

FIG. 5B shows exemplary tables with row notations. The first database table 506 matches with the first database table 202 in FIG. 2, the second database table 508 matches with the second database table 204 in FIG. 2, and the combined database table 510 matches with the combined database table 206 in FIG. 2. Each row in the database tables is denoted with row notations to indicate the rows of the primary key values.

Once the values inside a bit vector are determined, then rows of the first database table with matching values are combined with the rows of the second database table with matching values. The row having the matching value in the first database table can match with multiple rows having the matching value in the second database table. For example, the row v_$a_0$ of the first database table 506 with a matching primary key value "a" will be combined on the matching primary key value "a" to the row v_$a_1$ of the second database table 508 with a matching primary key value "a". After v_$a_0$ of the first database table is combined with the row v_$a_1$ of the second database table 404, the combined row (v_a') is copied to the combined database table 510. Since there are three v_$a_1$ rows in the second database table 508 the row of the first database table 506 (v_$a_0$) will be combined three times to the three v_$a_1$ rows of the second database table 508. The combined database table 510 would have three combined rows (v_a') with the matching primary key value of "a".

Since the values inside a sorted combined table are secret shared, the bit vector is be used to determine which values need to be copied. Having a bit value 0 from a bit vector indicates that there is no matching value in the first database table for the current value. Since there is no matching of the current value, embodiments move to next bit until bit value 1 comes.

Having a bit value 1 from a bit vector indicates that there is a match of the current value in the first database table. If the left adjacent bit value is 0 and the current bit value is 1, then the row of the left adjacent value is copied to the row of the current value. For example, in the first bit vector 502B, the first value is 0) and the second value is 1. The row (v_$a_0$) of the matching value (first value) is combined with the row (v_$a_1$) of the matching value (second value). In another example, in the first bit vector 502B, the second value is 1 and the third value is 1. The row (v_$a_0$) of the matching value (second value), which is obtained previously from the first value, is combined with the row having the matching value (third value) of the second database table. The rows of the matching values are combined to create combined rows. The combined rows are then duplicated to the combined database table 206.

The first database table 506 and the second database table 508 can be joined to generate the combined database table (e.g., combined database table 510) in various ways. One way to perform a join is to copy all the rows of the second database table 508 to the combined database table 510, and copy and combine the rows of the first database table of matching values to the combined database table 510. The rows that do not have matching values can be deleted from the combined database table 510. Another way to perform a join is to combine rows of the first database table 506 of matching values and rows of the second database table 508 of matching values, and copy the combined rows to the combined database table 510.

When the rows are combined for including in the combined database table 510, the combined rows would have values of {v_a', v_a', v_a', v_g'}, where v_a' and v_g' indicates combined rows of the first database table and the second database table with matching values "a" and "g".

However, there are cases where a row having the matching value from the first database table is combined multiple times to the rows of the matching value from the second database table. For example, for the second sorted combined table 504A, there is one matching value "$a_0$" where the row having the matching value (v_$a_0$) is combined with seven rows of the matching value ($a_1$). This is also indicated in the second bit vector 504B where only the first value is 0 and the rest of the bit vector values have a value of 1. Combining the matching row (v_$a_0$) one by one will result in a linear number of steps (n) and a linear runtime (O(n)). This is computationally inefficient. To solve this, a tree can be used to combine the rows of the matching values from the first database table to the second database table.

IV. Duplications Using a Tree

Combining of the matching rows from a first database table to a second database table can be done using a tree to increase the efficiency in computation. The tree can be a binary tree whose nodes have at most two child nodes, which are referred to as a left child node and a right child node. A node without any child node is called a leaf node, and a node without any parent nodes is called root node. The algorithm using a tree to combine the matching values of the first database table to the second database table is separated into two phases: an upstream phase and a downstream phase.

The upstream phase consists of updating the parent nodes starting from the leaf nodes all the way up to the root node. For example, the leaf nodes (602A-602H) will have initial values which will be used to update parent values (e.g., nodes 603A-603D), and the updates will continue until all the way up to the root node (605A). Each node in the tree will be updated with an array of three values using a first set of functions that is described in detail with reference to FIG. 6. Updating the nodes in the tree has a $\log_2(n)$ number of steps, with a logarithmic runtime of $O(\log_2(n))$.

A. Upstream Phase

Figure 6:
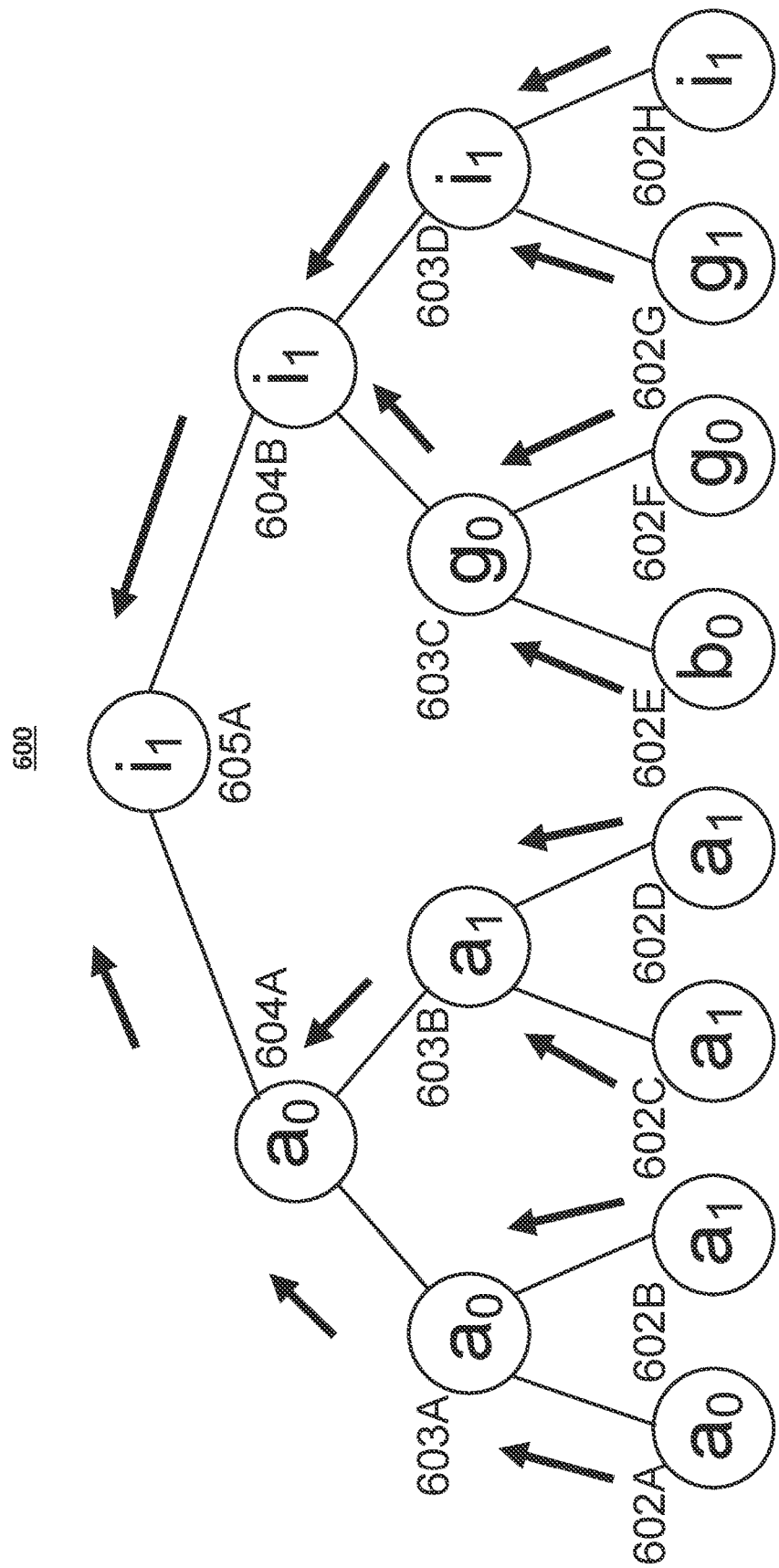
FIG. 6 shows an upstream method of duplication using a tree.

FIG. 6 shows an exemplary tree 600 that performs upstream method of duplication. Leaf nodes (602A-602H) of the tree 600 are comprised of values inside a sorted combined table 606A. Each node in the tree has an array of three values: node's current item (v), node's product bit (p), and node's left-most bit (l). For ease of illustration, the example is for a left-most bit, although the order can be swapped, and a right-most bit can be used. The array for each node is determined according to the first set of functions.

The sorted combined table 606A matches with the first sorted combined table 502A from FIG. 5A, and a bit vector 606B matches to the first bit vector 502B from FIG. 5A. The sorted combined table 606A is comprised of values $x_1, \ldots, x_n$, where each subscript number represents the index of the table and x represents the element at the index. For example, the $x_1$ of the sorted combined table 606A indicates the first value $a_0$, $x_3$ indicates the third value $a_1$, and etc. Similarly to the sorted combined table 606A, the bit vector 606B is comprised of values $y_1, \ldots, y_n$ where $y_1$ represents the first value 0, $y_3$ represents 1, and etc.

Each tree node is associated with an array of three values (v, p, l): item value (v), product bit (p), and left most bit (l). A leaf node i is given the initial item value of $x_i$ of the sorted combined table 606A, the product bit (p) of $y_1$ of the bit vector 606B, and the left most bit (l) of $y_i$ of the bit vector 606B.

As an illustrative example, a first leaf node 602A has an item value (v) of $a_0$ corresponding to $x_i$ of the sorted combined table 606A. The first leaf node 602A will have a product bit (p) of 0 corresponding to $y_1$ of the bit vector 606B, and the left most bit (l) of 0 corresponding to $y_1$. The second leaf node 602B has an item value of $a_1$ corresponding to $x_2$ of the sorted combined table 606A. The second leaf node will have a product bit (p) of 1 corresponding to $y_2$ of the bit vector 606B, and the left most bit (l) of 1 corresponding to $y_2$.

A third leaf node 602C has an array of ($a_1$, 1, 1), fourth leaf node 602D has an array of ($a_1$, 1, 1), fifth leaf node 602E has an array of ($b_0$, 0, 0), sixth leaf node 602F has an array of ($g_0$, 0, 0), seventh leaf node 602G has an array of ($g_1$, 1, 1), and eighth leaf node 602H has an array of ($i_1$, 0, 0), where each item value (v) in a leaf node corresponds to the $i^{th}$ element in the sorted combined table 606A and each product bit (p) and left most bit (l) corresponds to the $i^{th}$ element in the bit vector 606B.

After the leaf nodes are updated, arrays of nodes (v, p, l) in upper level of the tree can be determined. In particular, given child arrays where a left child has an array ($v_0, p_0, l_0$) and a right child has an array ($v_1, p_1, l_1$), the parent node has an array (v, p', l') according to the first set of functions where $$v' = v_{\{1 XOR p_1\}}$$

$$p' = p_1 * p_0$$

$$l' = l_0$$

As an illustrative example, consider a node 603A with two child nodes 602A and 602B. From the earlier example, the left child node 602A has the item value ($v_0$) of $a_0$, the product bit ($p_0$) of 0, and the left most bit ($l_0$) of 0. The right child node 602B has the item value ($v_1$) of $a_1$, the product bit ($p_1$) of 1, and the left most bit ($l_1$) of 1. The array of three values can be obtained by applying the functions:

$$v' = v_{\{1\,XOR\,p_1\}} = v_{\{1\,XOR\,1\}} = v_0 = a_0$$
$$p' = p_1 * p_0 = 1 * 0 = 0$$
$$l' = l_0 = 0$$

Therefore, the node 603A has an item value (v') of $a_0$, a product bit (p') of 0, and a left most bit value of 0.

A node 603B has an array of ($a_1$, 1, 1) with a left child node 602C with an array of ($a_1$, 1, 1) and a right child node 602D with an array of ($a_1$, 1, 1), a node 603C has an array of ($g_0$, 0, 0) with a left child node 602E with an array of ($b_0$, 0, 0) and a right child node 602F with an array of ($g_0$, 0, 0), and a node 603D has an array of ($i_1$, 0, 1) with a left child node 602G with an array of ($g_1$, 1, 1) and a right child node 602H with an array of ($i_1$, 0, 0) by using the first set of functions.

A node 604A has an array of ($a_0$, 0, 0) with a left child node 603A with an array of ($a_0$, 0, 0) and a right child node 603B with an array of ($a_1$, 1, 1), and a node 604B has an array of ($i_1$, 0, 0) with a left child node 603C with an array of ($g_0$, 0, 0) and a right child node 603D with an array of ($i_1$, 0, 1) by using the first set of functions. A node 605A has an array of ($i_1$, 0, 0) with a left child node 604A with an array of ($a_0$, 0, 0) and a right child node 604B with an array of ($i_1$, 0, 0) using the first set of functions.

The upstream computations are done for each level of the tree, determining an array (v, p, l) for every node in the tree until the root node. The item values of the nodes after upstream computations can be seen in FIG. 6. The following computations of nodes can be processed in parallel, which results in a runtime of $O(\log_2(n))$. Once all the nodes of the tree are updated by the upstream phase, the downstream phase will push values back down the tree to the leaves, starting at the root.

B. Downstream Phase

The downstream phase consists of updating the children nodes starting from the root node all the way down to the leaf nodes. The nodes in the tree have already been updated with arrays of three values from the upstream phase, and the downstream phase uses the arrays from the upstream phase to update item values of the nodes. For example, the root node (705A) and its children nodes (704A and 704B) will have initial array of three values (v, p, l), which will be used to update the values of the children nodes (704A and 704B). Each node in the tree will be updated with an updated item value (v) using a second set of functions that is described in detail in FIG. 7. Updating the nodes in the tree for the downstream phase has a $\log_2(n)$ number of steps, with a logarithmic runtime of $O(\log_2(n))$.

Figure 7:
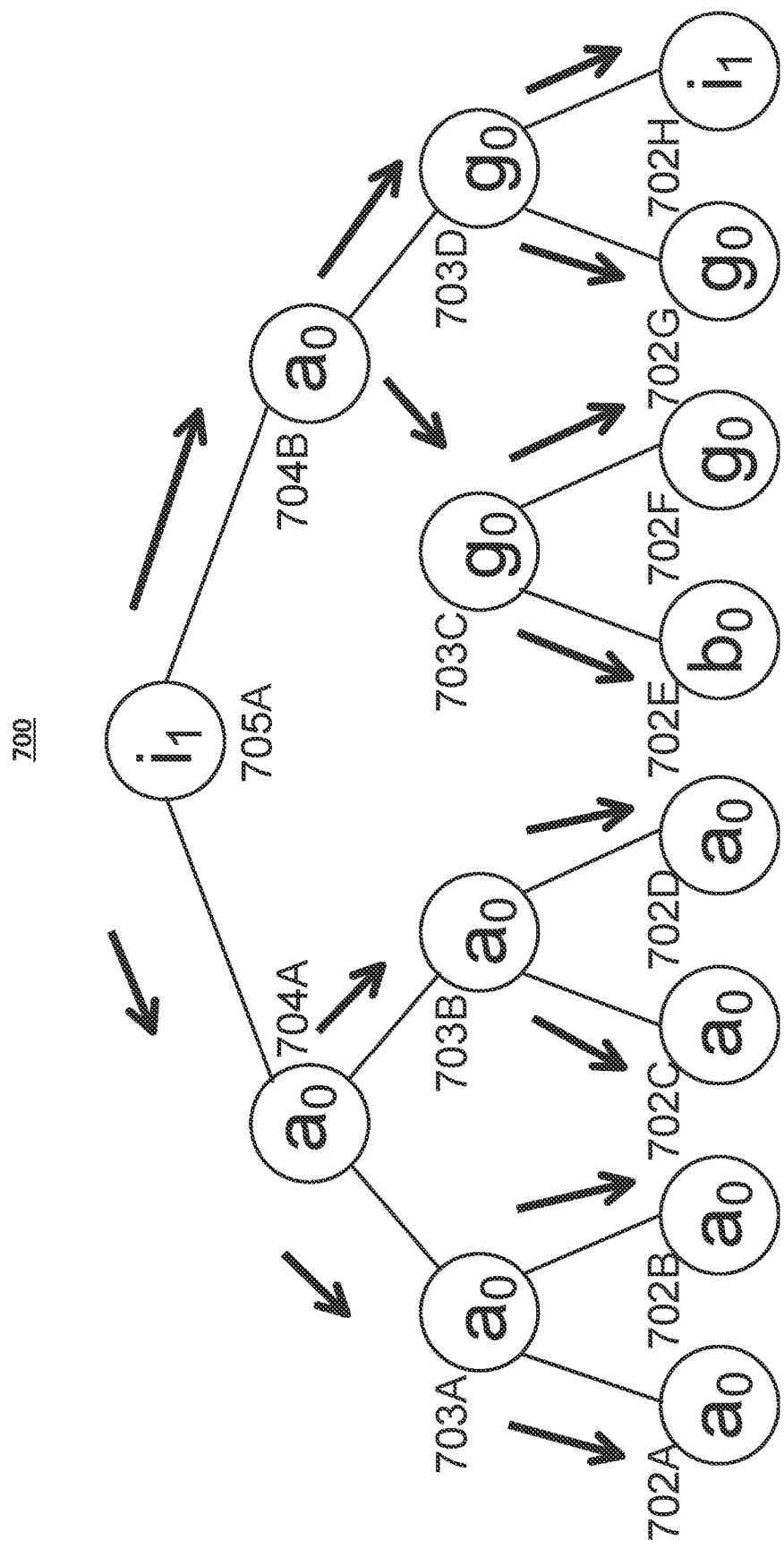
FIG. 7 shows a downstream method of duplication using a tree.

FIG. 7 shows an exemplary tree with node item values after performing a downstream method of a duplication. As the downstream phase starts from the root to the leaf nodes, the tree nodes are updated according to operations that determine a node's item value (v), product bit (p), and left-most bit (l).

Starting from the root node all the way down to the leaf nodes, the nodes will be updated according to following rules: given some internal parent node with an array (v', p', l'), a left child node of the parent node with an array ($v_0$, $p_0$, $l_0$), and a right child node of the parent node with an array ($v_1$, $p_1$, $l_1$), the item values of the left child node ($v_0$') and the right child node ($v_1$') will be updated according to the second set of functions $$v'_0 = \text{if } (l_0 = 1) \text{ then } v', \text{ else } v_0$$
$$v'_1 = \text{if } (p_0 = 1) \text{ then } v', \text{ else } v_0$$

That is, the updated item value of the left child node ($v_0$') will have parent's item value (v') if its left most bit ($l_0$) is 1. Otherwise, it keeps its original item value ($v_0$). The updated item value of the right child node ($v_1$') will have parent's item value if the product bit of the left child node ($p_0$) is 1. Otherwise, it will have the left child node's original item value ($v_0$). Once the item values of the children nodes are updated, other values of the children nodes, such as product bit (p) and left most bit (l), are no longer used.

As an illustrative example, a node 705A has an item value (v') of $i_1$. A left child node 704A has an item value ($v_0$) of $a_0$, product bit ($p_0$) of 0, and left most bit ($l_0$) of 0. A right child node 704B has an item value ($v_1$) of $i_1$, product bit ($p_1$) of 0, and left most bit ($l_1$) of 0. These values are determined by the upward phase that updated every node with arrays (v, p, l) in FIG. 6. Applying the second set of functions used to obtain the updated item value of the left child node 704A, since $l_0$ is not equal to 1, the updated item value of the left child node ($v'_0$) will have its original value $v_0$ ($a_0$). For the updated item value of the right child node 704B, since $p_0$ is not equal to 1, the updated item value of the right child node ($v'_1$) will have the original item value of the left child node $v_0$ ($a_0$).

A node 704A with an updated item value of $a_0$ has a left child node 703A with an array ($a_0$, 0, 0) and a right child node 703B with an array ($a_1$, 1, 1). By using the second set of function, the left child node 703A will have an updated item value of $a_0$ and the right child node 703B will have an updated item value of $a_0$. A node 704B with an updated item value of $a_0$ has a left child node 703C with an array ($g_0$, 0, 0) and a right child node 703D with an array ($i_1$, 0, 1). By using the second set of function, the left child node 703C will have an updated item value of $g_0$ and the right child node 703D will have an updated item value of $g_0$.

When pushing values into the leaf nodes, an extra logic is added to the right child node ($v_1$:), where $$v'_1 = \text{if } (l_1 = 1) \text{ then (if } (p_0 = 1) \text{ then } v', \text{ else } v_0), \text{ else } (v_1)$$

That is, if the left most bit of the right child node ($l_1$) is 1, then the updated item value of the right child node ($v_1$') will have parent's item value (v') if the product bit of the left child node ($p_0$) is also 1. Otherwise, it will have the left child node's original item value ($v_0$). However, if the left most bit of the right child node ($l_1$) is 0, then the updated item value of the right child node ($v_1$') will keep the original right child node item value ($v_1$). The item values of the nodes after downstream computations can be seen in FIG. 7.

As an illustrative example, a node 703A has an updated item value (v) of $a_0$. The left child node 702A has item value ($v_0$) of $a_0$, product bit ($p_0$) of 0, and left most bit ($l_0$) of 0. The right child node 702B has item value ($v_1$) of $a_1$, product bit ($p_1$) of 1, and left most bit ($l_1$) of 1. The arrays of children nodes are obtained from the upward phase in FIG. 6. The operation in the second set of function used to determine the left child node ($v'_0$) stays the same. The updated item values of the left child node 702A ($v'_0$), since $l_0$ is not equal to 1, will have its original item value $v_0$ ($a_0$). Applying the updated logic used to obtain the updated item value of the right child node 702B ($v'_1$), the updated item value of the right child node ($v'_1$), since its left most bit ($l_1$) is 1 and $p_0$ is 0, will have the item value of the left child node $v_0$ ($a_0$).

A node 703B with an updated item value of $a_0$ has a left child node 702C with an array ($a_1$, 1, 1) and a right child node 702D with an array ($a_1$, 1, 1). By using the second set of function, the left child node 702C will have an updated item value of $a_0$ and the right child node 702D will have an updated item value of an. A node 703C with an updated item value of $g_0$ has a left child node 702E with an array ($b_0$, 0, 0) and a right child node 702F with an array ($g_0$, 0, 0). By using the second set of function, the left child node 702E will have an updated item value of $b_0$ and the right child node 702F will have an updated item value of $g_0$. A node 703D with an updated item value of $g_0$ has a left child node 702G with an array ($g_1$, 1, 1) and a right child node 702H with an array ($i_1$, 0, 0). By using the second set of function, the left child node 702G will have an updated item value of $g_0$ and the right child node 702H will have an updated item value of $i_1$.

When the leaf nodes are updated during the downward phase, the row of the updated item values are combined with the row of the original item values to create a combined row. In FIG. 7, the nodes 702B, 702C, 702D are updated with the item value $a_0$ while the node 702G is updated with the item value $g_0$. The rows of the updated item value and original item value are combined to create combined rows. For example, the original item value of the node 702B is $a_1$ and the updated item value of the node 702B is $a_0$. Since each of these item values in FIG. 7 are based off of the matching columns of the first database table 402 and the second database table 404, the row of the first database table 402 with the matching column value $a_0$ will be combined with the row of the second database table 404 with the matching column value $a_1$ to create a combined row (v_a'). These combined rows would be duplicated to create a combined database table 206. Since all the combined rows are secret shared, the combined database table 306 will also be secret shared.

V. Secret Shares Distribution

The shares of a combined database table (e.g., combined database table 206) could be distributed among the servers. The shares may be distributed such that a single share does not permit the server to identify the values of the combined database table. If the server wants to access the values of the combined database table, then the server needs to communicate with other servers to obtain all the shares of the combined database table.

The individual database tables that the different parties use as inputs for secret shared database join are both secret shared prior to join. The individual database tables may be secret shared among the servers in various ways. One way is to use an output database table of the secret shared join in one instance as an input database table of the secret shared join in another instance. In such a scenario, each computer may also hold a secret share to the input database tables. Another way is for the parties with the complete individual database tables to distribute the shares of the individual database table to the other parties directly. Yet another way can be that some external parties have already distributed the secret shares of the individual database tables to the servers before the join.

Figure 8:
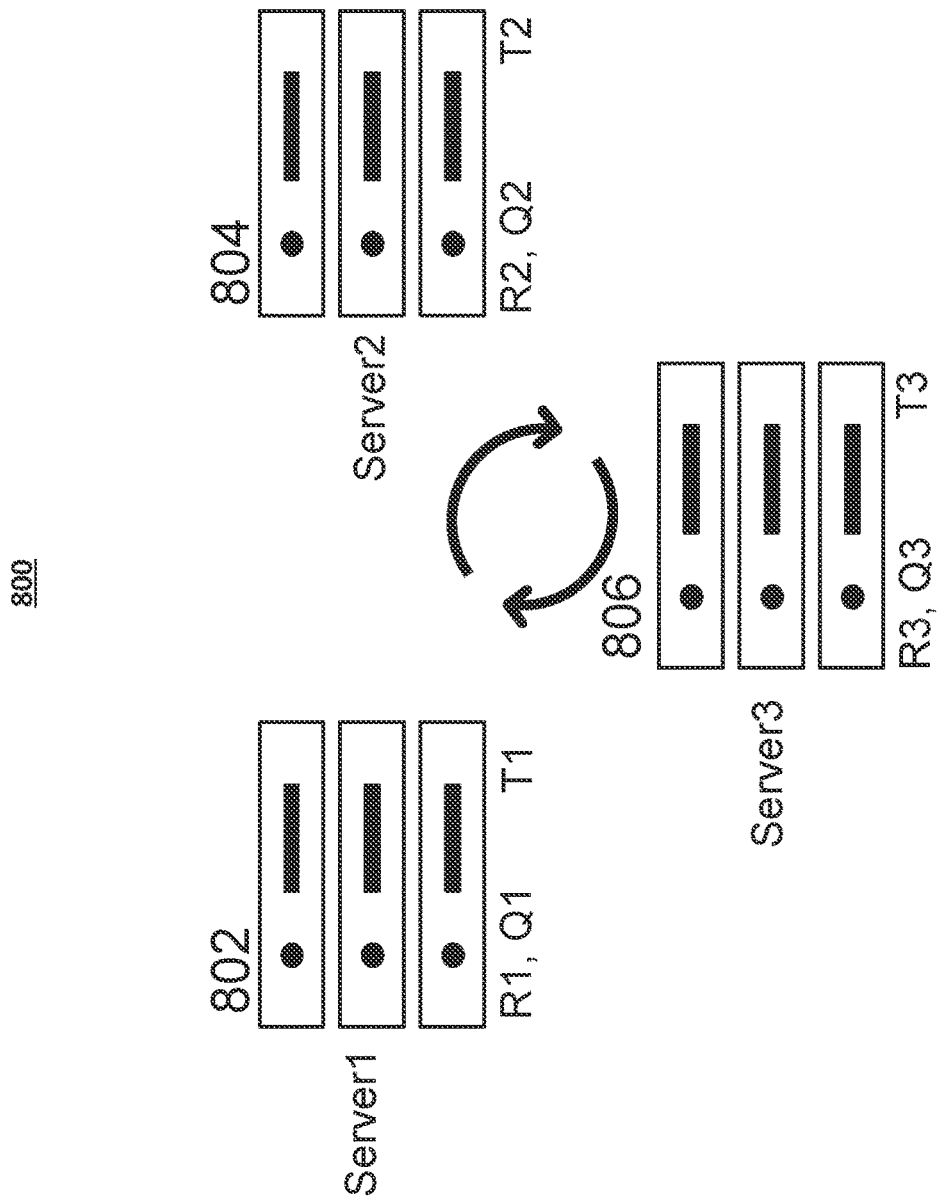
FIG. 8 shows exemplary servers doing a secure multi-party computation on database tables.

FIG. 8 shows three servers (first server 802, second server 804, and third server 806) that each hold a secret share of a first database table R ($R_1$, $R_2$, $R_3$), a second database table Q ($Q_1$, $Q_2$, $Q_3$), and a combined database table T ($T_1$, $T_2$, $T_3$). These servers may communicate to each other by sending their secret shares to one another to perform an operation such as join.

Since the first database table R and the second database table Q are secret shared, a secret shared database table join can be used to join the two database tables to output the combined database table T. Because the first database table R and the second database table Q are secret shared, the secret database join between the two database tables is performed using multi-party computation involving all three servers. Therefore, every step involving secret shared database join such as sorting, comparing, and duplicating can be done among the three servers.

The output of the secret shared database table join, i.e., the combined database table T, can also be secret shared, and the shares of the combined database table T may be automatically distributed among the three servers as a result of the join. If needed, the three servers can communicate with each other to exchange the shares of the combined database table T.

The shares of the combined database table T distributed among the servers can be used in various ways. One way is to use the shares of the combined database table T as an input database table for another secret shared database join. Another way is to access the values in the combined database table T. A server can access the values in the combined database table T when the server obtains all the shares of the combined database table T. The shares of the combined database table T can be obtained by the server communicating with other servers to receive shares of the combined database table. However, the other servers can deny the request to give the shares to the server and prevent the server from accessing the values of the combined database table T.

Embodiments of the disclosure have a number of advantages. Using the embodiments of the disclosure, a one-to-many secret shared database join is possible. Prior to this invention, only a one-to-one join secret shared database join was possible, severely limiting the types of database tables that could be joined together. Distributing the shares of the combined output also gives more power to each server. Each server, by having a share of the combined output, has a power to give access to the combined output to other servers. Therefore, in a situation where combined output may expose important information of a server, the server can choose not to exchange the share to other servers and prevent other servers from access to the combined database table.

Additionally, the embodiments are fully composable, meaning an output database table of the secret shared join in one instance can be used as an input database table of the secret shared join in another instance. This allows the computers to keep doing operations (e.g. join, intersection, and etc.) over and over while keeping the underlying data secret. It is also possible to perform a private set union operation as a set of SQL join operations, since a one to many relationship is allowed.

VI. Example Method for Secret Share Database Join

Figure 9:
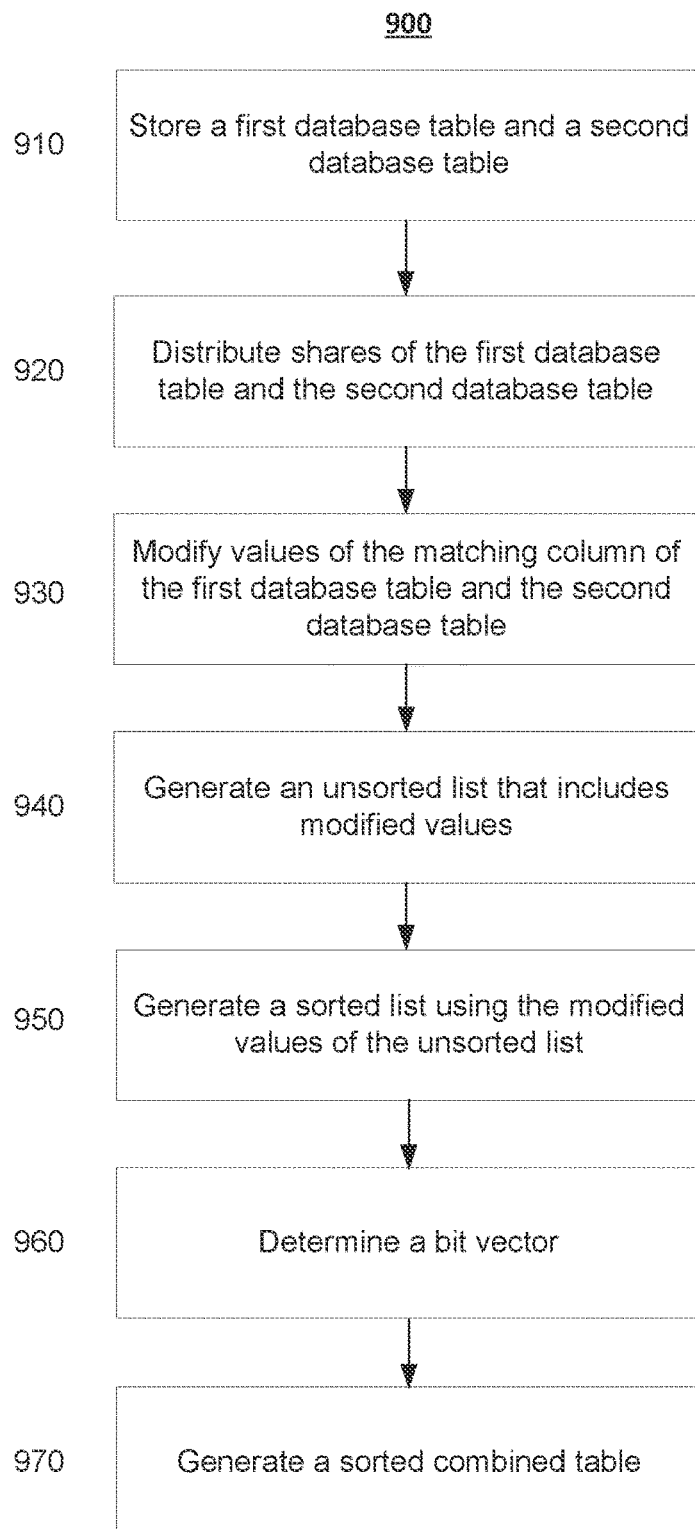
FIG. 9 shows a flowchart corresponding to performing a secret shared database join on shared databases.

FIG. 9 shows a flowchart corresponding to performing a secret shared database join on shared databases. The secret-shared database join of a first database table and a second database table are stored respectively on a first computer and a second computer. The secret-shared database join is a multi-party computation method involving the first computer and the second computer. The method comprises steps 910 through 970.

As described above, the database tables are secret shared among the two computers, and potentially additional computers. For example, a value in the first database table can be split into multiple shares, and each share can be distributed to a different computer. The first computer can generate shares of the first database table, and the second computer can generate shares of the second database table. The shares of a database table are generated such that a single share does not permit a computer to identify the values of the database table, but can reconstruct the values when a sufficient number of the shares are combined.

Step 910 comprises storing the first database table having a first column and a second column by the first computer, and storing the second database table having a first column and a third column by the second computer. In some embodiments, the first database table and the second database table can have more than two columns. For example, the first database table 202 in FIG. 2 has three columns. The columns in the first database table and the second database are database fields with specific properties. For example, the first column can be a database field of "user ID" and the second column can be a database field of "user names". The first database table and the second database table each have first columns, and the first column can be used to join the first database table and the second database table. The values inside the first column of the first database table can be different than the values inside the first column of the second database table. The column that is being used to join between the two databases is referred as the "matching column" or "primary key", and the values within the matching column that are the same between the two databases are referred as the "matching values" or "primary values".

Step 920 comprises the first computer distributing shares of the first database table to the second computer. The second computer also distributes shares of the second database table to the first computer. In some embodiments, the shares of the first database table and the second database table are already distributed prior to storing in the step 910. The shares of a database table are distributed such that a single share does not permit a computer to identify the values of the database table. If the computer wants to access the values of the database table, then the computer needs to obtain all the shares of the database table.

Step 930 comprises modifying values of the matching column of the first database table and the second database table. First values, or values of the matching column of the first database table, are appended with a first identifier that indicates the first values correspond to the first database table. In some embodiments, the first identifier is indicated with number 0). The first values and the first identifier are combined to generate first modified values. Second values, or values of the matching column of the second database table, are appended with a second identifier that indicates the second values correspond to the second database table. In some embodiments, the second identifier is indicated with number 1. The second values and the second identifier are combined to generate second modified values. A modified value includes (1) a first value or a second value and (2) either of the first identifier or the second identifier.

Step 940 comprises generating an unsorted list that includes the first modified values and the second modified values. The first modified values and the second modified values can be combined such that all the first modified values of the first database table come first, and all the second modified values of the second database table come after. The unsorted list is also referred to as an unsorted combined table.

Step 950 comprises sorting the first modified values and the second modified values of the unsorted list to create a sorted list. The values of the unsorted list is sorted where a first modified value comes first, and second modified values that match with the corresponding first modified value come next. For example, an unsorted combined table 406 in FIG. 4 has a first modified value of "$a_0$". This is appended first and the next values that are appended are second modified values "$a_1$" that match "$a_0$". Therefore, in the sorted combined table 408, this is represented as $\{a_0, a_1, a_1, a_1, \ldots\}$. If there is no match, then the first modified value with no match is appended and the next first modified value is used to check if there are matches with the values in the second modified values. The sorted list is also referred to as a sorted combined table.

Step 960 comprises determining a bit vector by comparing a current modified value of the sorted list to a previous modified value to determine whether a match exists. A bit value of 0) can indicate there is no match between the current modified value and the previous modified value, and a bit value of 1 can indicate there is a match. If there is a match, then this indicates the current modified value is a matching value in the matching column of the first database and the second database. A bit value in the bit vector specifies whether a row having the matching value of the first database table, where the row includes values of the first column and the second column, and a row having the matching value of the second database table, where the row includes values of the first column and the third column, are to be combined on the matching value and copied to a row of a combined database table. The bit vector may have a length equal to a sum of a number of rows in the first database table and a number of rows of the second database table. In some embodiments, a tree can be used to combine and copy to the combined database table.

Step 970 comprises generating the combined database table using the bit vector, values of the second column of the first database table, and values of the third column of the second database table. The matching values between the first database table and the second database table are determined by using the bit vector, where bits indicate if match exists. The combined database table consists of combined matching rows, or rows of the matching values of the first database table and the second database table combined on the matching values. The combined matching rows consist of values of the columns from the first database table and the second database table, such as values from the first column of the first database table and the third column of the second database table.

VII. Computer System

Figure 10:
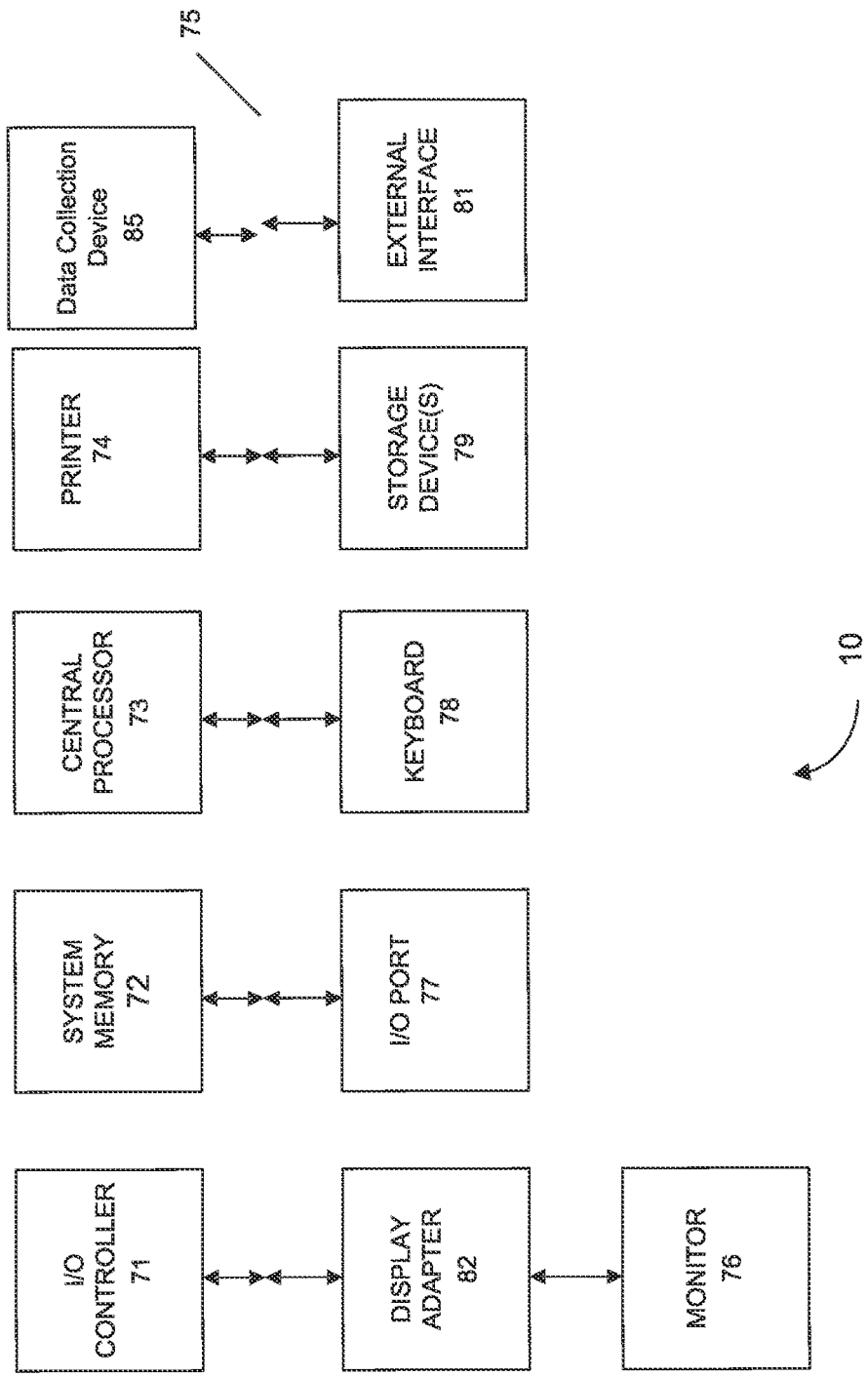
FIG. 10 shows a block diagram of an example computer system usable with systems and methods according to embodiments of the present disclosure.

Any of the computer systems mentioned herein may utilize any suitable number of subsystems. Examples of such subsystems are shown in FIG. 10 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 10 are interconnected via a system bus 75. Additional subsystems such as a printer 74, keyboard 78, storage device(s) 79, monitor 76 (e.g., a display screen, such as an LED), which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g., Ethernet, Wi-Fi, or other network interface) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems. e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g., an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer-readable medium for storage and/or transmission. A suitable non-transitory computer-readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer-readable medium may be any combination of such devices. In addition, the order of operations may be re-arranged. A process can be terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on." When a Markush group or other grouping is used herein, all individual members of the group and all combinations and subcombinations possible of the group are intended to be individually included in the disclosure.

All patents, patent applications, publications, and descriptions mentioned herein are incorporated by reference in their entirety for all purposes. None is admitted to be prior art. Where a conflict exists between the instant application and a reference provided herein, the instant application shall dominate.

What is claimed is:

1. A method of performing a secret-shared join of a first database table and a second database table stored respectively on a first computer and a second computer, the method comprising performing, by the first computer, a multi-party computation in conjunction with the second computer:

storing the first database table having a first column and a second column, the first column used to join the first database table and the second database table, wherein the second database table includes the first column and a third column, wherein the first column is a matching column between the first database table and the second database table;

distributing shares of the first database table to the second computer, wherein the second computer distributes shares of the second database table to the first computer;

modifying first values of the of the matching column of the first database table by appending a first identifier that indicates the first values correspond to the first database table, thereby generating first modified values, wherein a first modified value includes a first value and the first identifier;

modifying second values of the matching column of the second database table by appending a second identifier that indicates the second values correspond to the second database table, thereby generating second modified values, wherein a second modified value includes second value and the second identifier;

generating an unsorted list that includes the first modified values and the second modified values;

sorting the first modified values and the second modified values of the unsorted list to create a sorted list;

determining a bit vector by comparing a current modified value of the sorted list to a previous modified value to determine whether the current modified value is a matching value, wherein a bit value in the bit vector specifies whether a row having the matching value of the first database table and a row having the matching value of the second database table are to be combined in a combined row of a combined database table, wherein the bit vector has a length equal to a sum of a number of rows in the first database table and a number of rows of the second database table; and generating the combined database table using the bit vector, values of the second column of the first database table, and values of the third column of the second database table.

2. The method of claim 1, wherein the row having the matching value in the first database table matches with multiple rows having the matching value in the second database table.

3. The method of claim 1, wherein the sorted list comprises one of the first modified values followed by one or more second modified values that match the one of the first modified values.

4. The method of claim 1, wherein the values of the matching column of the first database table are unique to each other.

5. The method of claim 4, wherein the secret-shared join is a one-to-many database join, wherein the matching column of the second database table is unbounded.

6. The method of claim 1, wherein nodes of a tree are used to combine the row having the matching value in the first database table with one or more rows of the matching value of the second database table.

7. The method of claim 6, wherein the tree has an upstream phase for updating parent nodes starting from leaf nodes to a root node using a first set of functions, and a downstream phase for updating item values (v) of child nodes starting from the root node to the leaf nodes using a second set of functions after the upstream phase.

8. The method of claim 7, wherein the first set of functions is used to update each node of the tree in the upstream phase with an array of three values: node's current item (v), node's product bit (p), and node's left-most bit (1), wherein the array of three values is used during the downstream phase to update child nodes.

9. The method of claim 7, wherein the second set of functions specifies whether a row of an updated item value of a leaf node is to be combined with a row of an original item value before updating of the leaf node.

10. The method of claim 1, wherein a share of the first database table is generated by selecting a random number and then taking an XOR of the random number and a value of the first database table.

11. A first computer comprising:
a processor;
a network interface; and
a non-transitory computer-readable medium comprising code for instructing the processor to implement a method of performing a secret-shared join of a first database table and a second database table stored respectively on the first computer and a second computer, the method comprising performing, by the first computer, a multi-party computation in conjunction with the second computer, the method comprising:

storing the first database table having a first column and a second column, the first column used to join the first database table and the second database table, wherein the second database table includes the first column and a third column, wherein the first column is a matching column between the first database table and the second database table;

distributing shares of the first database table to the second computer, wherein the second computer distributes shares of the second database table to the first computer;

modifying first values of the of the matching column of the first database table by appending a first identifier that indicates the first values correspond to the first database table, thereby generating first modified values, wherein a first modified value includes a first value and the first identifier;

modifying second values of the matching column of the second database table by appending a second identifier that indicates the second values correspond to the second database table, thereby generating second modified values, wherein a second modified value includes second value and the second identifier;

generating an unsorted list that includes the first modified values and the second modified values;

sorting the first modified values and the second modified values of the unsorted list to create a sorted list;

determining a bit vector by comparing a current modified value of the sorted list to a previous modified value to determine whether the current modified value is a matching value, wherein a bit value in the bit vector specifies whether a row having the matching value of the first database table and a row having the matching value of the second database table are to be combined in a combined row of a combined database table, wherein the bit vector has a length equal to a sum of a number of rows in the first database table and a number of rows of the second database table; and generating the combined database table using the bit vector, values of the second column of the first database table, and values of the third column of the second database table.

12. The first computer of claim 11, wherein the row having the matching value in the first database table matches with multiple rows having the matching value in the second database table.

13. The first computer of claim 11, wherein the sorted list comprises one of the first modified values followed by one or more second modified values that match the one of the first modified values.

14. The first computer of claim 11, wherein the values of the matching column of the first database table are unique to each other.

15. The first computer of claim 14, wherein the secret-shared join is a one-to-many database join, wherein the matching column of the second database table is unbounded.

16. The first computer of claim 11, wherein nodes of a tree are used to combine the row having the matching value in the first database table with one or more rows of the matching value of the second database table.

17. The first computer of claim 16, wherein the tree has an upstream phase for updating parent nodes starting from leaf nodes to a root node using a first set of functions, and a downstream phase for updating item values (v) of child nodes starting from the root node to the leaf nodes using a second set of functions after the upstream phase.

18. The first computer of claim 17, wherein the first set of functions is used to update each node of the tree in the upstream phase with an array of three values: node's current item (v), node's product bit (p), and node's left-most bit (1), wherein the array of three values is used during the downstream phase to update child nodes.

* * * * *